(12) United States Patent
Verma et al.

(10) Patent No.: US 12,363,150 B2
(45) Date of Patent: Jul. 15, 2025

(54) SYSTEM AND METHOD FOR SECURED DATA ANALYSIS AND SYNTHETIC IDENTITY DETECTION IN A DISTRIBUTED LEDGER NETWORK

(71) Applicant: BANK OF AMERICA CORPORATION, Charlotte, NC (US)

(72) Inventors: Sandeep Verma, Haryana (IN); Pavan Chayanam, Alamo, CA (US); Srinivas Dundigalla, Waxhaw, NC (US); Nandini Rathaur, Maharashtra (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 217 days.

(21) Appl. No.: 18/208,934

(22) Filed: Jun. 13, 2023

(65) Prior Publication Data

US 2024/0422180 A1  Dec. 19, 2024

(51) Int. Cl.
*H04L 9/40* (2022.01)
*G06N 20/00* (2019.01)
*H04L 9/00* (2022.01)
*H04L 9/14* (2006.01)
*H04L 9/30* (2006.01)

(52) U.S. Cl.
CPC ......... *H04L 63/1425* (2013.01); *G06N 20/00* (2019.01); *H04L 9/14* (2013.01); *H04L 9/3073* (2013.01); *H04L 9/50* (2022.05)

(58) Field of Classification Search
CPC ..... H04L 63/1425; H04L 9/14; H04L 9/3073; H04L 9/50; H04L 9/3239; G06N 20/00
See application file for complete search history.

(56) References Cited

U.S. PATENT DOCUMENTS

| | | |
|---|---|---|
| 10,819,509 B2 | 10/2020 | Zhang et al. |
| 10,958,637 B2 | 3/2021 | Cage et al. |
| 11,159,326 B1 | 10/2021 | Nelson et al. |
| 11,277,260 B2 | 3/2022 | Sen et al. |
| 11,308,487 B1 | 4/2022 | Foster et al. |
| 11,329,807 B2 | 5/2022 | Fletcher et al. |
| 11,356,263 B2 | 6/2022 | Fletcher et al. |
| 11,468,439 B2 | 10/2022 | Durvasula et al. |
| 11,475,442 B1 | 10/2022 | James et al. |
| 2022/0067738 A1* | 3/2022 | Fang ............... G06Q 20/389 |
| 2022/0067752 A1* | 3/2022 | Fang ............... H04L 63/20 |
| 2022/0103356 A1 | 3/2022 | Be'Ery et al. |

(Continued)

*Primary Examiner* — Michael Won
(74) *Attorney, Agent, or Firm* — Moore & Van Allen PLLC; Andrew T. Wood

(57) ABSTRACT

Systems, computer program products, and methods are described herein for secured data analysis and synthetic identity detection in a distributed ledger network. The present invention is configured to receive an event for a predetermined set of occurrences, generate a first hash packet and a second hash packet, wherein the first hash packet is generated by applying a hashing engine to a first identifier, and wherein the second hash packet is generated by applying the hashing engine to a second identifier, generate, by a distributed ledger server, a first key pair, generate, by the member of the distributed ledger network, a second key pair, encrypt a bundle using the first public key, wherein the bundle comprises the first and second hash packets, and appending the bundle to the transaction object, wherein the transaction object is distributed to the distributed ledger network.

17 Claims, 9 Drawing Sheets

(56) References Cited

U.S. PATENT DOCUMENTS

| | | |
|---|---|---|
| 2022/0150073 A1 | 5/2022 | Androulaki et al. |
| 2022/0224513 A1 | 7/2022 | Pande et al. |
| 2022/0398567 A1 | 12/2022 | Novotny et al. |
| 2022/0417025 A1 | 12/2022 | Fletcher et al. |
| 2023/0344640 A1* | 10/2023 | Natanzon ............... H04L 63/123 |
| 2025/0038954 A1* | 1/2025 | Stefanich .............. G06F 21/602 |

* cited by examiner

SYSTEM AND METHOD FOR SECURED DATA ANALYSIS AND SYNTHETIC IDENTITY DETECTION IN A DISTRIBUTED LEDGER NETWORK

FIELD OF THE INVENTION

The present invention embraces a system for secured data analysis and synthetic identity detection in a distributed ledger network.

BACKGROUND

In the current landscape of identity protection, one of the pressing challenges is synthetic identity misappropriation. This form of misappropriation involves the creation of deceitful identities by combining real and fabricated information, making it difficult to detect and prevent. To effectively address this issue, there is a need for a secure system and method that can analyze data and detect synthetic identities within a distributed ledger network. By implementing such a solution, organizations can enhance their ability to identify and prevent synthetic identity misappropriation, ensuring the integrity and security of their systems and data.

BRIEF SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for secured data analysis and synthetic identity detection in a distributed ledger network is presented. The system may include a processing device, and a non-transitory storage device having a distributed ledger application stored therein, wherein the distributed ledger application may include a distributed ledger comprising a plurality of transaction objects, wherein the distributed ledger application may include instructions that, when executed by the processing device, causes the processing device to perform the steps of: receiving an event from a member of the distributed ledger network for at least one of a predetermined set of occurrences requiring creation of a transaction object, generating a first hash packet and a second hash packet, wherein the first hash packet is generated by applying a hashing engine to a first identifier, and wherein the second hash packet is generated by applying the hashing engine to a second identifier, generating, by a distributed ledger server, a first key pair comprising a first public key and a first private key for the member of the distributed ledger network, generating, by the member of the distributed ledger network, a second key pair comprising a second public key and a second private key, wherein the second key pair is provided to the distributed ledger server for communication from the distributed ledger server to the member of the distributed ledger network, encrypting a bundle using the first public key, wherein the bundle may include the first and second hash packets, and appending the bundle, after encryption, to the transaction object, wherein the transaction object is distributed to the distributed ledger network.

In some embodiments, executing the instructions further causes the processing device to perform the steps of: extracting, using an extraction engine and the second key pair, the first and second hash packet from the bundle, aggregating, based on the first hash packet, and into a pattern tree database, the first hash packet and the second hash packet, determining, using an anomaly detection engine, a presence of an anomaly associated with the first hash packet in the pattern tree database, and transmitting, from the distributed ledger server to at least one distributed ledger member using the second key pair, an indication of the anomaly.

In some embodiments, the anomaly is detected via a static analysis process, wherein the static analysis process may include: analyzing the second hash packets associated with the first hash packet in the pattern tree database, applying a set of predefined rules indicative of a synthetic identity, determining the presence of an anomaly in the pattern tree database by comparing a pattern of the first hash packet in the pattern tree database to the predefined rules, and generating and transmitting an alert of the anomaly.

In some embodiments, the anomaly is detected via a dynamic pattern analysis process, wherein the dynamic pattern analysis process may include: training a machine learning engine on historical pattern tree databases to adaptively determine the presence of an anomaly, wherein training may include: preprocessing and transforming historical pattern tree database data, extracting relevant features by applying a set of predefined rules, and training the machine learning engine on the relevant features. The dynamic pattern analysis process further may include: analyzing, in real time by the machine learning engine, the pattern tree database for presence of the anomaly, and generating and transmitting an alert of the anomaly.

In some embodiments, the pattern tree database further may include activities and/or violations.

In some embodiments, each member retains their respective cross-reference list for the first hash packet.

In some embodiments, the member of the distributed ledger network is provided a unique first public key.

In another aspect, a computer program product for secured data analysis and synthetic identity detection in a distributed ledger network is presented. The computer program product may include a non-transitory computer-readable medium including code causing an apparatus to receive an event from a member of the distributed ledger network for at least one of a predetermined set of occurrences requiring creation of a transaction object, generate a first hash packet and a second hash packet, wherein the first hash packet is generated by applying a hashing engine to a first identifier, and wherein the second hash packet is generated by applying the hashing engine to a second identifier, generate, by a distributed ledger server, a first key pair comprising a first public key and a first private key for the member of the distributed ledger network, generate, by the member of the distributed ledger network, a second key pair comprising a second public key and a second private key, wherein the second key pair is provided to the distributed ledger server for communication from the distributed ledger server to the member of the distributed ledger network, encrypt a bundle using the first public key, wherein the bundle may include the first and second hash packets, and append the bundle, after encryption, to the transaction object, wherein the transaction object is distributed to the distributed ledger network.

In yet another aspect, a method for secured data analysis and synthetic identity detection in a distributed ledger network is presented. The method may include receiving an event from a member of the distributed ledger network for at least one of a predetermined set of occurrences requiring creation of a transaction object, generating a first hash packet and a second hash packet, wherein the first hash packet is generated by applying a hashing engine to a first identifier, and wherein the second hash packet is generated by applying the hashing engine to a second identifier, generating, by a distributed ledger server, a first key pair comprising a first public key and a first private key for the member of the distributed ledger network, generating, by the member of the distributed ledger network, a second key pair comprising a second public key and a second private key, wherein the second key pair is provided to the distributed ledger server for communication from the distributed ledger server to the member of the distributed ledger network, encrypting a bundle using the first public key, wherein the bundle may include the first and second hash packets, and appending the bundle, after encryption, to the transaction object, wherein the transaction object is distributed to the distributed ledger network.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
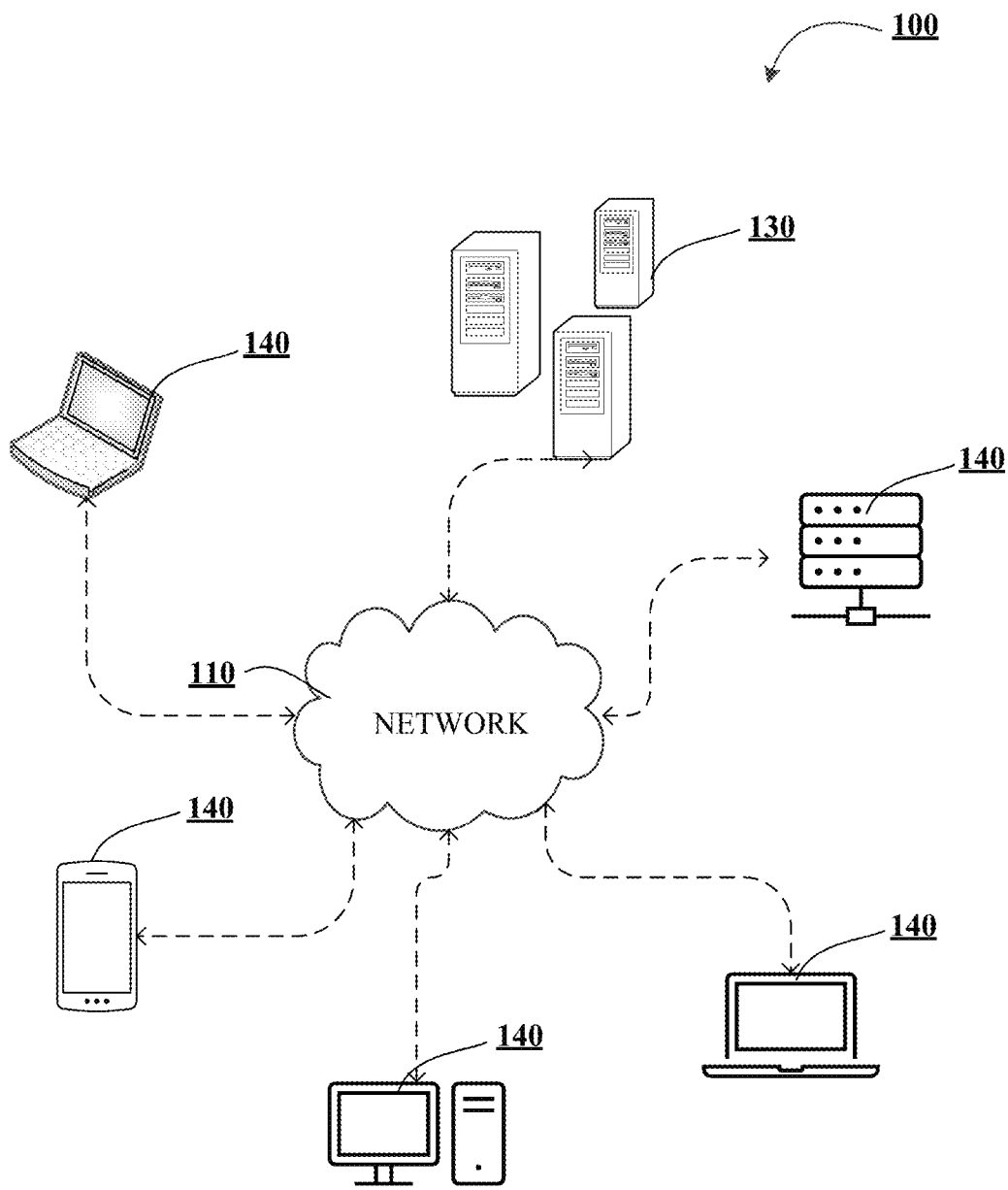
Figure 1B:
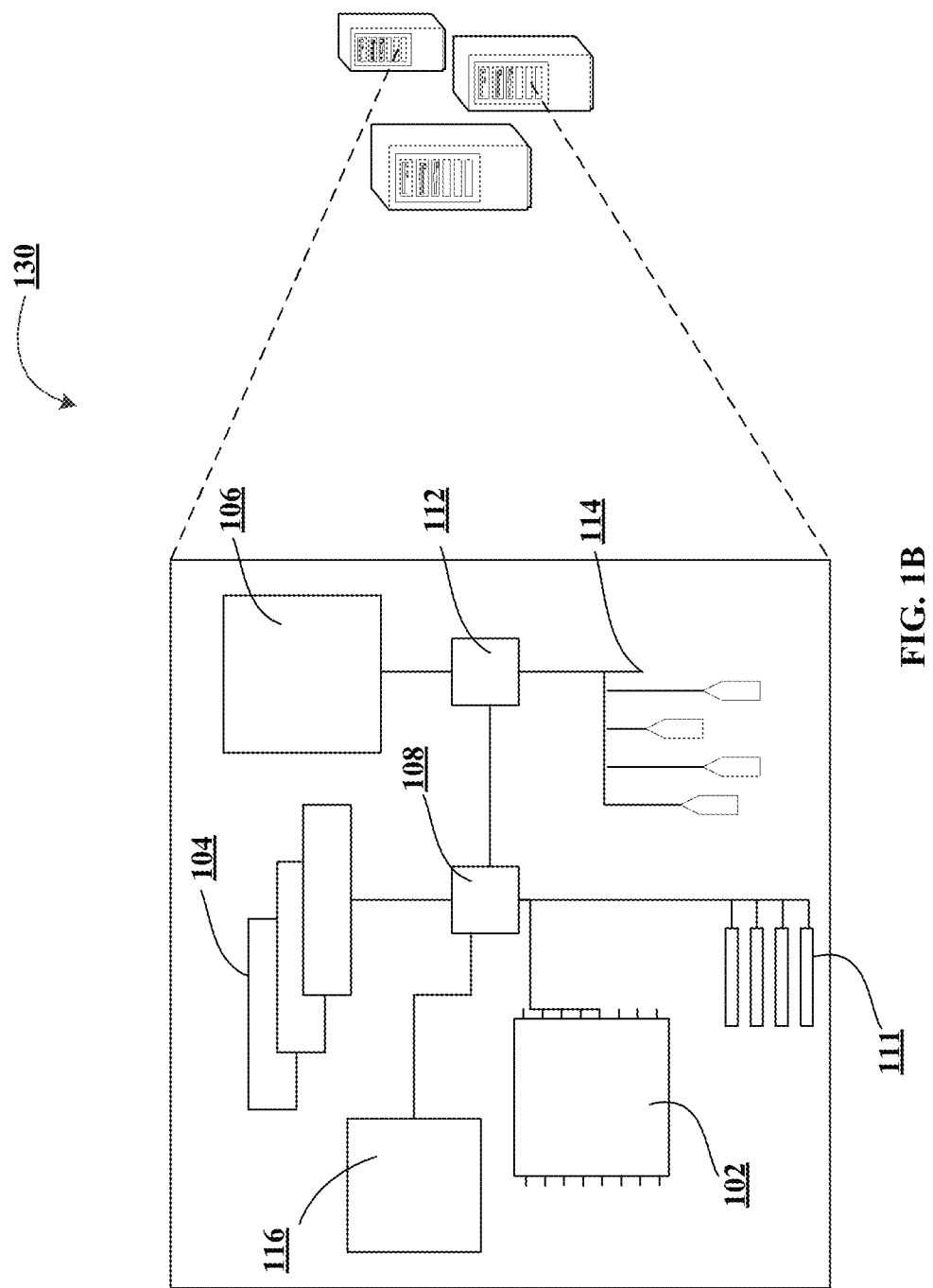
Figure 1C:
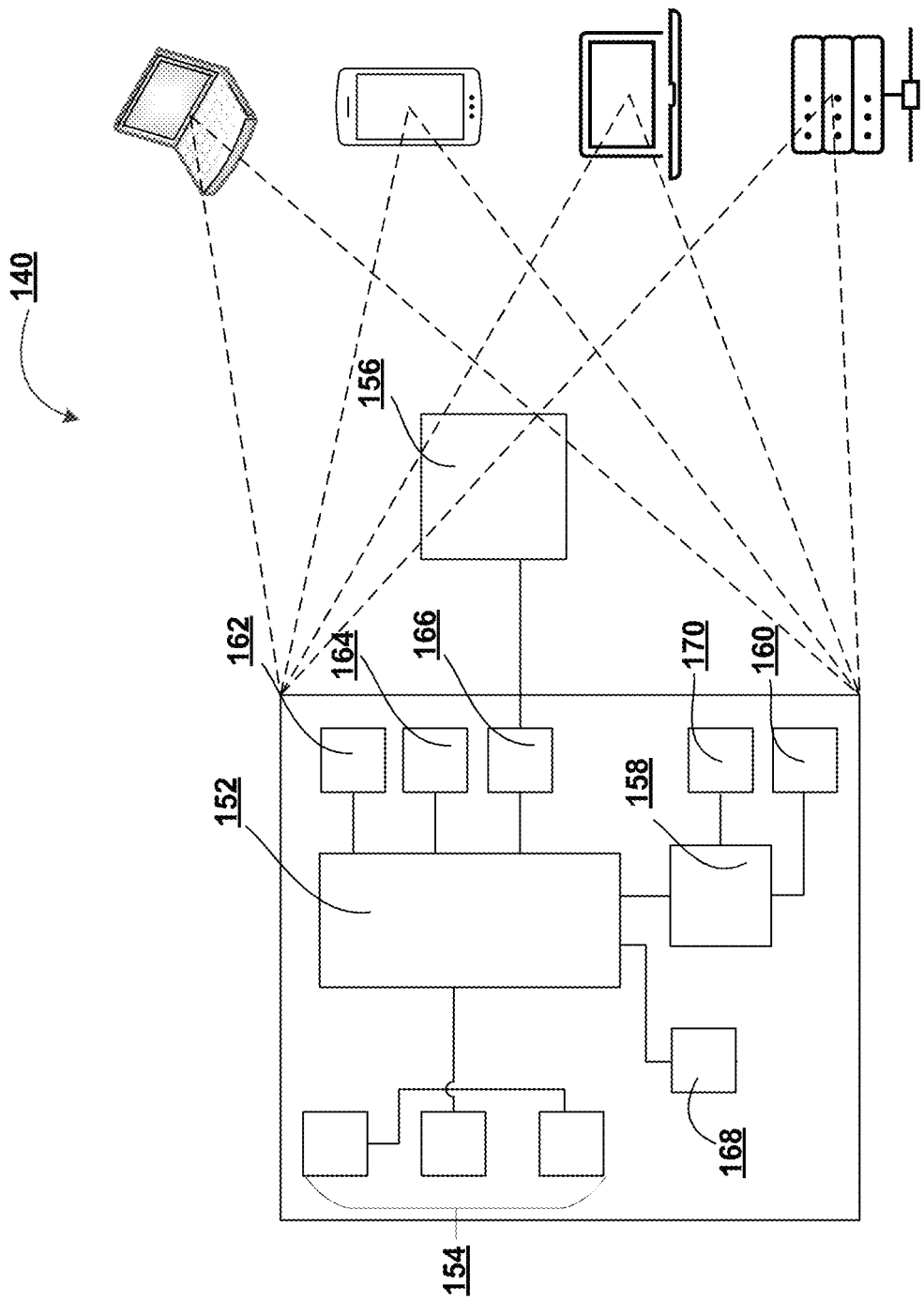
Figure 2A:
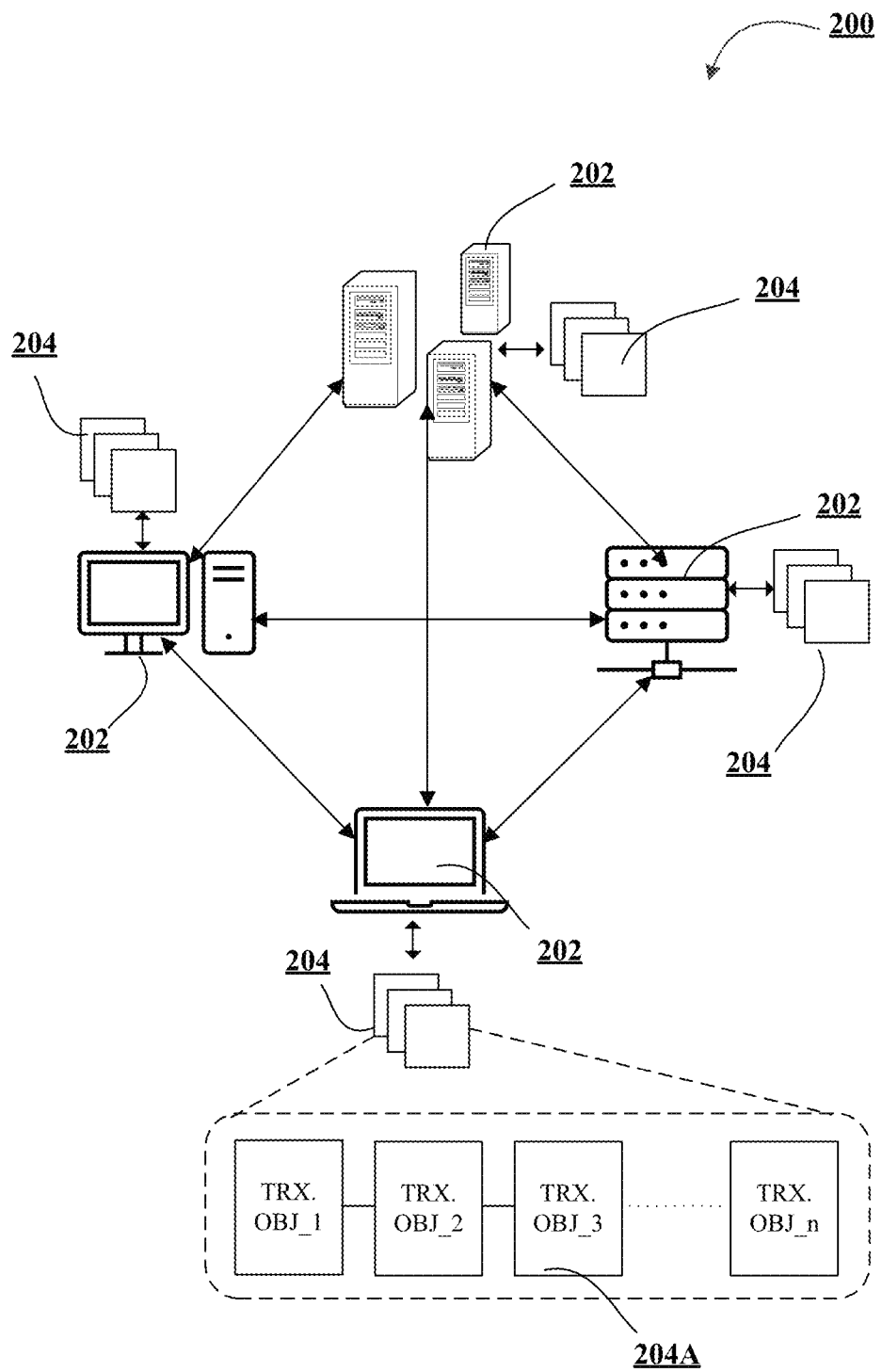
Figure 2B:
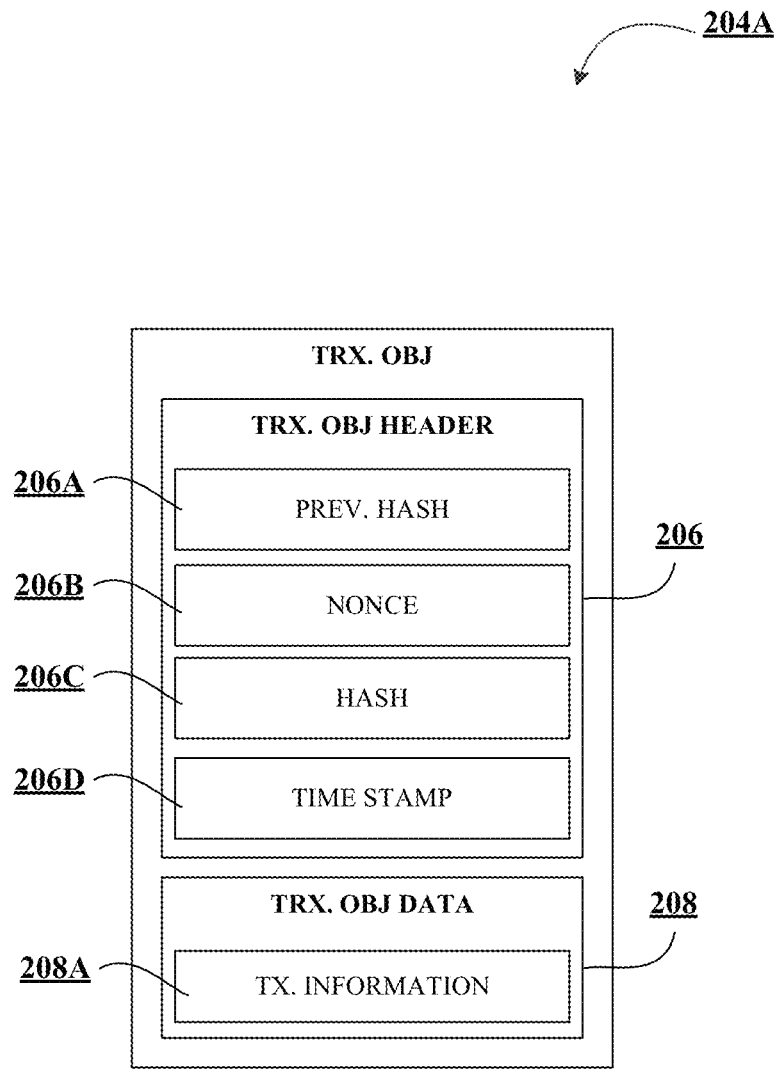
Figure 3:
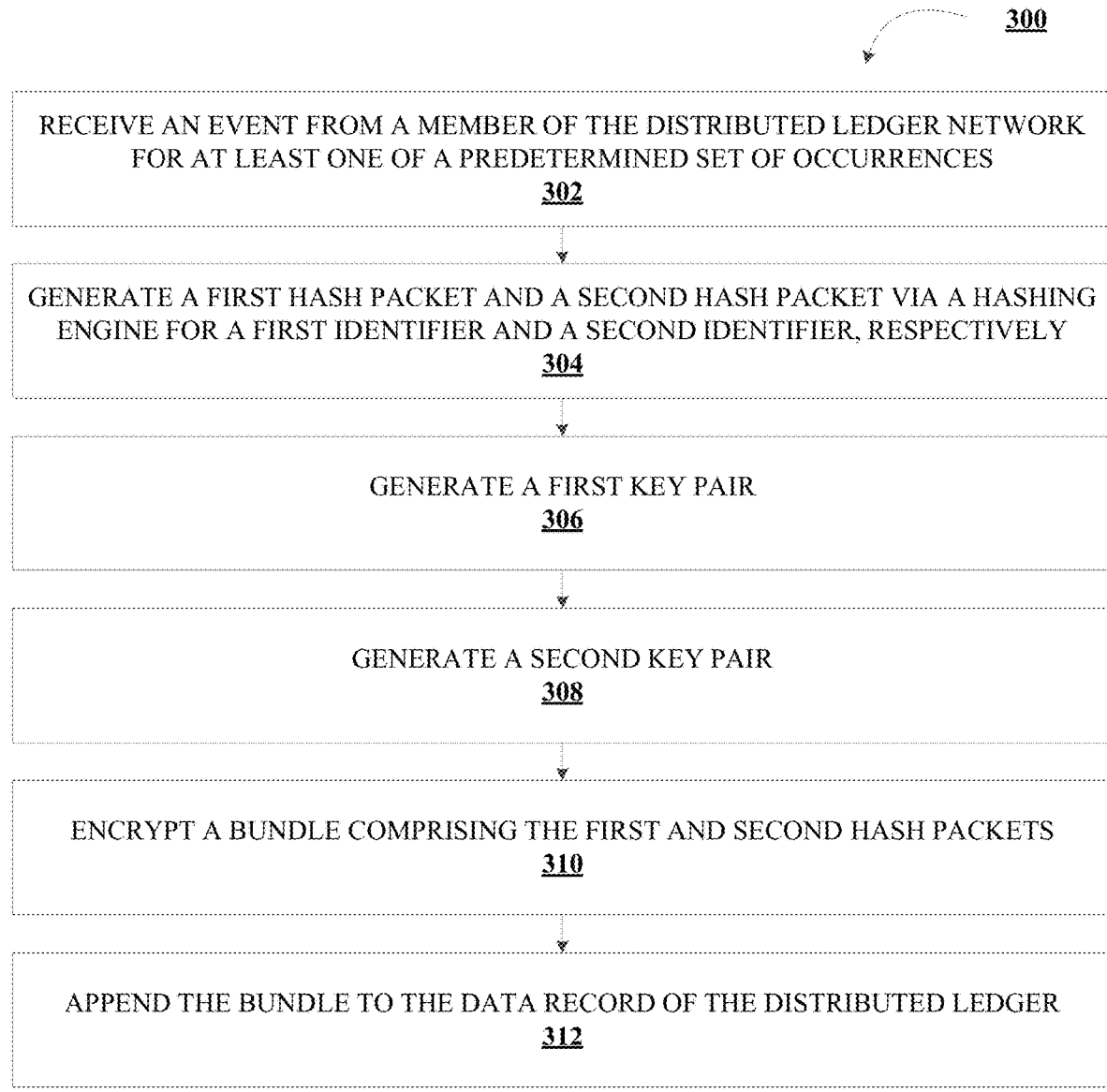
Figure 4:
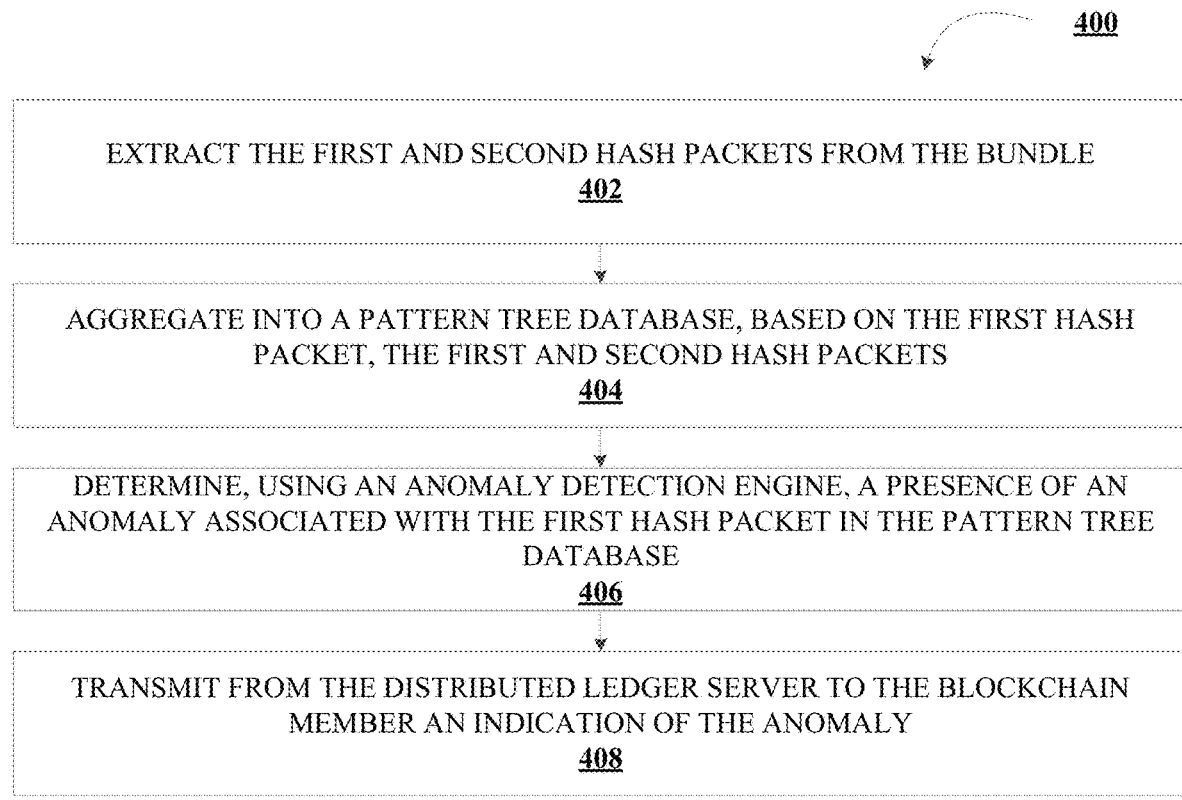
Figure 5:
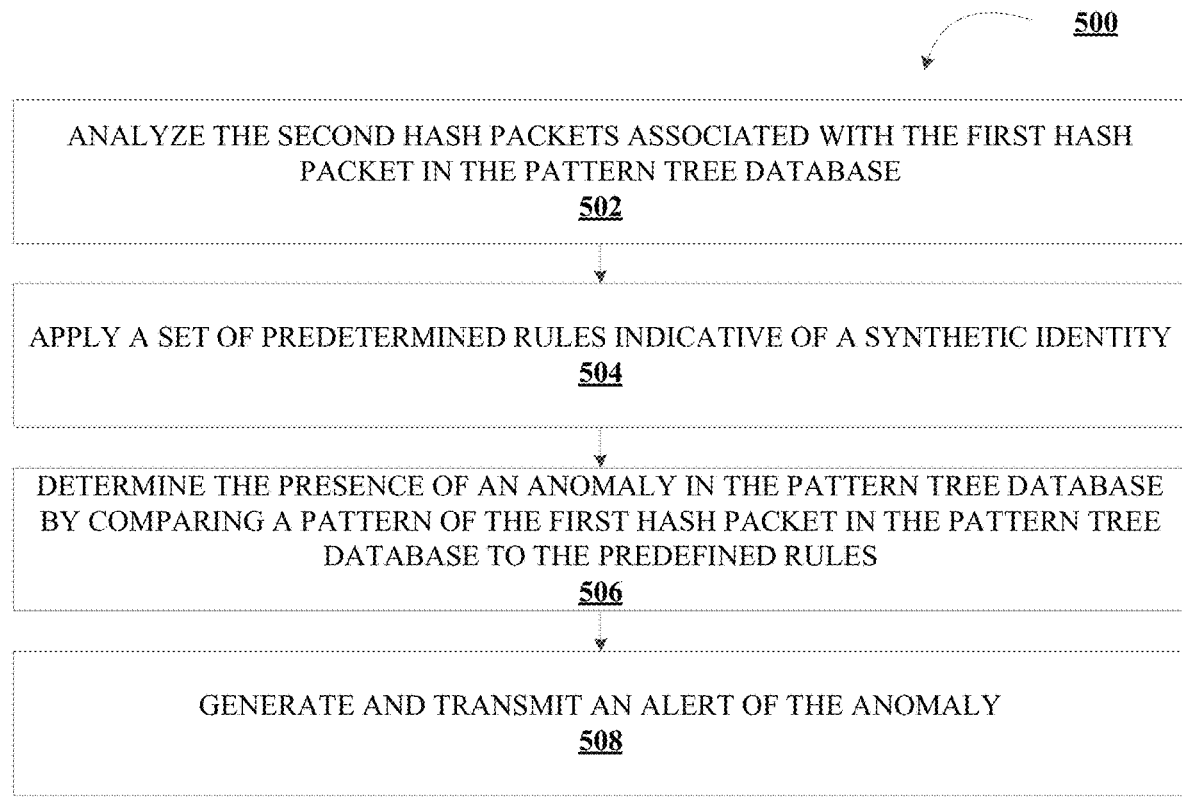
Figure 6:
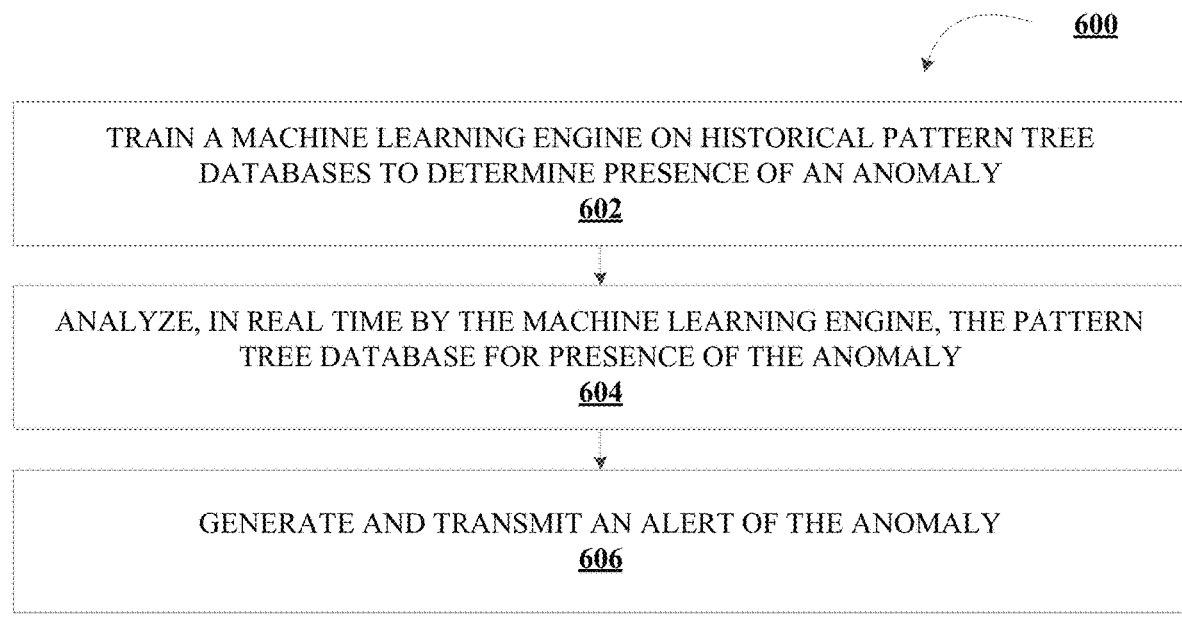

Having thus described embodiments of the invention in general terms, reference will now be made the accompanying drawings, wherein:

FIGS. 1A-1C illustrate technical components of an exemplary distributed computing environment for secured data analysis and synthetic identity detection in a distributed ledger network, in accordance with an embodiment of the invention;

FIGS. 2A-2B illustrate an exemplary distributed ledger technology architecture, in accordance with an embodiment of the invention;

FIG. 3 illustrates a flow diagram for network flow analysis in a distributed ledger network, in accordance with an embodiment of the invention;

FIG. 4 illustrates a flow diagram for secured data analysis and synthetic identity detection in a distributed ledger network, in accordance with an embodiment of the invention;

FIG. 5 illustrates a flow diagram for an anomaly engine for secured data analysis and synthetic identity detection in a distributed ledger network, in accordance with an embodiment of the invention; and FIG. 6 illustrates a flow diagram for an anomaly engine for secured data analysis and synthetic identity detection in a distributed ledger network, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, a "hashing engine" refers to a computational algorithm designed to convert data of any size into a fixed-size string of characters, commonly referred to as a hash. One such hashing engine is SHA-256 (Secure Hash Algorithm 256-bit). However, other hashing algorithms are available as well, including by not limited to MD5 a SHA-1. The hashing engine takes the input data and applies a series of mathematical operations to generate a unique and irreversible hash value. The resulting hash serves as a digital fingerprint of the original data, providing a concise representation that is highly unlikely to collide with hashes from different inputs. Hashing engines are used in various applications, including data integrity verification, password storage, digital signatures, and cryptographic protocols, as they offer efficient and secure ways to handle and verify data integrity.

As used herein, a "machine learning engine" may refer to a computational system that employs algorithms and statistical techniques to process and analyze data in order to discover patterns, extract insights, and make predictions or decisions. The machine learning engine operates through various embodiments, such as neural networks, support vector machines, decision trees, or ensemble methods, each with their own strengths and applicability. Implemented through parallel processing architectures, distributed computing frameworks, or specialized hardware accelerators like graphics processing units (GPUs), the machine learning engine optimizes the training and inference processes. The machine learning engine utilizes optimization algorithms, such as stochastic gradient descent or evolutionary algorithms, to iteratively adjust model parameters and minimize prediction errors. Additionally, it may incorporate feature engineering, dimensionality reduction, or regularization techniques to enhance model performance and mitigate overfitting. By leveraging large-scale datasets, the machine learning engine learns complex representations and generalizes from training examples to make accurate predictions or decisions on unseen data.

A crucial aspect of the machine learning engine is its training methodology, which involves iteratively refining model parameters through exposure to labeled or unlabeled data. Supervised learning methods employ annotated training data to guide the model's optimization process, while unsupervised learning methods aim to extract meaningful patterns from unlabeled data. Additionally, semi-supervised and reinforcement learning approaches leverage both labeled and unlabeled data, or feedback signals from an environment, respectively. The training process typically involves iterative epochs, where the machine learning engine updates the model's weights using gradient-based optimization techniques, such as backpropagation or evolutionary strategies. Regularization techniques like dropout, batch normalization, or early stopping are employed to prevent overfitting and improve generalization. Hyperparameter tuning, through methods like grid search or Bayesian optimization, further enhances model performance. By adapting to the underlying data distribution, the machine learning engine can capture intricate relationships and exhibit robust predictive capabilities in various domains and applications.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, and as will be understood by one skilled in the art, a "key" refers to a unique value that is generated using cryptographic algorithms. The key enables secure communication and data exchange within the distributed ledger network. Keys are typically generated as pairs, consisting of a public key and a private key.

A "public key" may refer to part of the key pair used in asymmetric encryption. It is widely distributed and shared openly across the network. The public key is designed to encrypt data or verify digital signatures generated by the corresponding private key. It is mathematically derived from the private key but cannot be feasibly reverse-engineered to reveal the private key. Due to its public nature, the public key allows anyone in the network to encrypt messages intended for the owner of the corresponding private key.

A "private key" is the counterpart to the public key in the key pair, and is kept confidential and securely stored by the owner. The private key is used for decrypting data that has been encrypted with the corresponding public key or generating digital signatures. Unlike the public key, the private key must remain secret to maintain the integrity and security of the network. The private key is computationally linked to its corresponding public key, forming an asymmetric encryption system that ensures secure communication and authentication within the distributed ledger network.

As used herein, an "interaction" or "user interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, a transmission of a digital audio signal, or the like. As used herein, an "interacting user" may refer to a user who is engaging in the interaction, such as a caller to a helpdesk, a customer interacting with a digital assistant, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

The technology described herein implements an approach to utilize distributed ledger technology to facilitate secure information sharing among different entities while ensuring the confidentiality and privacy of customer sensitive data. Instead of sharing information in plain text, the data is encrypted by each participating entity. The encryption method employed is designed in such a way that even the entity performing the encryption cannot decrypt the shared information. This one-way encryption is achieved through a hashing algorithm. Furthermore, the hashed information is referenced by each entity within the distributed ledger network to create a pattern tree database which tracks hashed information as it relates to other hashed information between the entities. By leveraging this approach, the technology provides a robust and secure means of sharing sensitive information within a distributed ledger network.

Prior to the invention described herein, the state of technology in addressing synthetic identity misappropriation was inadequate. Malfeasant actors were able to deceive the system by creating duplicate identities using different combinations of Social Security Numbers ("SSN") and names, addresses, dates of birth, etc. They would apply for new accounts, credit cards, banking products, taking advantage of limited access initially granted due to sparse information available about the person. Over time, these malfeasant actors would gradually build credibility within the entity system, eventually obtaining large loans for deceitful purposes. The lack of collaboration between different entities holding user information, such as SSNs, dates of birth, or mailing addresses, further exacerbated the problem. Entities were unable to share information with one another due to the sensitive and confidential nature of the data, making it challenging to detect and prevent deceitful activities.

The challenge lay in finding a way for entities like banks, schools, clinical providers, and law enforcement agencies to collaborate and share relevant information securely. The sensitive nature of the data, combined with privacy concerns, made it practically impossible to establish direct communication channels between these partner entities. For instance, if an anomaly was detected at a school, it was difficult to effectively communicate this information to a banking system. The lack of an efficient and secure mechanism hindered the ability to address synthetic identity misappropriation attempts.

The invention disclosed herein provides a solution. The technical solution described here involves the creation of a blockchain network to address the challenges of synthetic identity misappropriation. The network includes participants such as credit bureaus, banks, driving license departments, clinical providers, universities, and other entities willing to share confidential information related to synthetic identity misappropriation. Each participant generates a unique set of private and public keys for secure communication with the blockchain network. Information shared by participants is encrypted using these keys, ensuring that even if the transmission line is compromised, the shared data cannot be directly linked to specific customers. Participants share identity information in the form of encrypted hashes using a complex hashing algorithm. The blockchain network analyzes the aggregated data and creates patterns and early warning systems to identify potential instances of synthetic identity misappropriation. The system employs static and dynamic rules, including predefined patterns and machine learning algorithms, to detect anomalies and notify members about potential misappropriation attempts. The blockchain network maintains data privacy and protection while providing aggregated information to enable misappropriation detection and prevention.

Accordingly, the present disclosure provides for the detection of synthetic identity creation activities by analyzing data. An event triggers the creation of a transaction object on a ledger. Two hash packets are generated using hashing, with one packet based on a first identifier and the other based on a second identifier. A server generates key pairs for a network member, consisting of a public key and a private key. The member also generates their own key pair, shared with the server. The hash packets are encrypted using the member's public key and added to the distributed ledger. An anomaly detection engine analyzes patterns in the ledger and alerts the member using their second key pair if anomalies are detected. The patterns related to the first hash packet are identified. The static analysis process checks for synthetic identities using predefined rules and generates alerts for anomalies. The dynamic pattern analysis involves training a machine learning engine on historical data, extracting relevant features, and generating real-time alerts for anomalies in the pattern tree database.

What is more, the present invention provides a technical solution to a technical problem. As described herein, the technical problem includes the prevalence of, and inability to detect, synthetic identity misappropriation, where malfeasant actors leverage fragmented personal information to obtain credit cards and loans through gradual credit building. The challenge arises from the lack of collaboration and information sharing between different entities holding sensitive user data, preventing effective detection and prevention of misappropriation. The technical solution presented herein allows for the establishment of a blockchain network that allows secure information sharing among trusted participants, including banks, credit bureaus, clinical providers, and educational institutions. Through encrypted communication and the use of encrypted hashes, the network analyzes aggregated data, identifies patterns, and employs static rules and machine learning algorithms to detect anomalies and alert members of potential misappropriation attempts. By maintaining data privacy and protection, the solution enables effective misappropriation detection and prevention within the network. In particular, the system is an improvement over existing identity tracking systems by allowing for the detection of synthetic identity misappropriation (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing and manual resources.

FIGS. 1A-1C illustrate technical components of an exemplary distributed computing environment 100 for secured data analysis and synthetic identity detection in a distributed ledger network, in accordance with an embodiment of the invention. As shown in FIG. 1A, the distributed computing environment 100 contemplated herein may include a system 130, an endpoint device(s) 140, and a network 110 over which the system 130 and endpoint device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the endpoint device(s) 140 may have a client-server relationship in which the endpoint device(s) 140 are remote devices that request and receive service from a centralized server, i.e., the system 130. In some other embodiments, the system 130 and the endpoint device(s) 140 may have a peer-to-peer relationship in which the system 130 and the endpoint device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The endpoint device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and one or more storage devices 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the one or more storage devices 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the endpoint device(s) 140, in accordance with an embodiment of the disclosure. As shown in FIG. 1C, the endpoint device(s) 140 includes a processor 152, memory 154, an input/output device such as a display 156, a communication interface 158, and a transceiver 160, among other components. The endpoint device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the endpoint device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the endpoint device(s) 140, such as control of user interfaces, applications run by endpoint device(s) 140, and wireless communication by endpoint device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of endpoint device(s) 140 with other devices. External interface 168 may provide, for example, for wired communication in some implementations, or for wireless communication in other implementations, and multiple interfaces may also be used.

The memory 154 stores information within the endpoint device(s) 140. The memory 154 can be implemented as one or more of a computer-readable medium or media, a volatile memory unit or units, or a non-volatile memory unit or units. Expansion memory may also be provided and connected to endpoint device(s) 140 through an expansion interface (not shown), which may include, for example, a SIMM (Single In Line Memory Module) card interface. Such expansion memory may provide extra storage space for endpoint device(s) 140 or may also store applications or other information therein. In some embodiments, expansion memory may include instructions to carry out or supplement the processes described above and may include secure information also. For example, expansion memory may be provided as a security module for endpoint device(s) 140 and may be programmed with instructions that permit secure use of endpoint device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the endpoint device(s) 140 to transmit and/or receive information or commands to and from the system 130 via the network 110. Any communication between the system 130 and the endpoint device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the endpoint device(s) 140 may provide the system 130 (or other client devices) permissioned access to the protected resources of the endpoint device(s) 140, which may include a GPS device, an image capturing component (e.g., camera), a microphone, and/or a speaker.

The endpoint device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to endpoint device(s) 140, which may be used as appropriate by applications running thereon, and in some embodiments, one or more applications operating on the system 130.

The endpoint device(s) 140 may also communicate audibly using audio codec 162, which may receive spoken information from a user and convert the spoken information to usable digital information. Audio codec 162 may likewise generate audible sound for a user, such as through a speaker, e.g., in a handset of endpoint device(s) 140. Such sound may include sound from voice telephone calls, may include recorded sound (e.g., voice messages, music files, etc.) and may also include sound generated by one or more applications operating on the endpoint device(s) 140, and in some embodiments, one or more applications operating on the system 130.

Various implementations of the distributed computing environment 100, including the system 130, and endpoint device(s) 140, and techniques described here can be realized in digital electronic circuitry, integrated circuitry, specially designed ASICs (application specific integrated circuits), computer hardware, firmware, software, and/or combinations thereof.

FIGS. 2A-2B illustrate an exemplary distributed ledger technology (DLT) architecture, in accordance with an embodiment of the invention. DLT may refer to the protocols and supporting infrastructure that allow computing devices (peers) in different locations to propose and validate transactions and update records in a synchronized way across a network. Accordingly, DLT is based on a decentralized model, in which these peers collaborate and build trust over the network. To this end, DLT involves the use of potentially peer-to-peer protocol for a cryptographically secured distributed ledger of transactions represented as transaction objects that are linked. As transaction objects each contain information about the transaction object previous to it, they are linked with each additional transaction object, reinforcing the ones before it. Therefore, distributed ledgers are resistant to modification of their data because once recorded, the data in any given transaction object cannot be altered retroactively without altering all subsequent transaction objects.

To permit transactions and agreements to be carried out among various peers without the need for a central authority or external enforcement mechanism, DLT uses smart contracts. Smart contracts are computer code that automatically executes all or parts of an agreement and is stored on a DLT platform. The code can either be the sole manifestation of the agreement between the parties or might complement a traditional text-based contract and execute certain provisions, such as transferring funds from Party A to Party B. The code itself is replicated across multiple nodes (peers) and, therefore, benefits from the security, permanence, and immutability that a distributed ledger offers. That replication also means that as each new transaction object is added to the distributed ledger, the code is, in effect, executed. If the parties have indicated, by initiating a transaction, that certain parameters have been met, the code will execute the step triggered by those parameters. If no such transaction has been initiated, the code will not take any steps.

Various other specific-purpose implementations of distributed ledgers have been developed. These include distributed domain name management, decentralized crowd-funding, synchronous/asynchronous communication, decentralized real-time ride sharing and even a general purpose deployment of decentralized applications. In some embodiments, a distributed ledger may be characterized as a public distributed ledger, a consortium distributed ledger, or a private distributed ledger. A public distributed ledger is a distributed ledger that anyone in the world can read, anyone in the world can send transactions to and expect to see them included if they are valid, and anyone in the world can participate in the consensus process for determining which transaction objects get added to the distributed ledger and what the current state each transaction object is. A public distributed ledger is generally considered to be fully decentralized. On the other hand, fully private distributed ledger is a distributed ledger whereby permissions are kept centralized with one entity. The permissions may be public or restricted to an arbitrary extent. And lastly, a consortium distributed ledger is a distributed ledger where the consensus process is controlled by a pre-selected set of nodes; for example, a distributed ledger may be associated with a number of member institutions (i.e., member nodes) (say 15), each of which operate in such a way that the at least 10 members must sign every transaction object in order for the transaction object to be valid. The right to read such a distributed ledger may be public or restricted to the participants. These distributed ledgers may be considered partially decentralized.

As shown in FIG. 2A, the exemplary DLT architecture 200 includes a distributed ledger 204 being maintained on multiple devices (nodes) 202 that are authorized to keep track of the distributed ledger 204. For example, these nodes 202 may be computing devices such as system 130 and client device(s) 140. One node 202 in the DLT architecture 200 may have a complete or partial copy of the entire distributed ledger 204 or set of transactions and/or transaction objects 204A on the distributed ledger 204. Transactions are initiated at a node and communicated to the various nodes in the DLT architecture. Any of the nodes can validate a transaction, record the transaction to its copy of the distributed ledger, and/or broadcast the transaction, its validation (in the form of a transaction object) and/or other data to other nodes.

As shown in FIG. 2B, an exemplary transaction object 204A may include a transaction header 206 and a transaction object data 208. The transaction header 206 may include a cryptographic hash of the previous transaction object 206A, a nonce 206B-a randomly generated 32-bit whole number when the transaction object is created, cryptographic hash of the current transaction object 206C wedded to the nonce 206B, and a time stamp 206D. The transaction object data 208 may include transaction information 208A being recorded. Once the transaction object 204A is generated, the transaction information 208A is considered signed and forever tied to its nonce 206B and hash 206C. Once generated, the transaction object 204A is then deployed on the distributed ledger 204. At this time, a distributed ledger address is generated for the transaction object 204A, i.e., an indication of where it is located on the distributed ledger 204 and captured for recording purposes. Once deployed, the transaction information 208A is considered recorded in the distributed ledger 204.

FIG. 3 illustrates a flow diagram 300 for network flow analysis in a distributed ledger network, in accordance with an embodiment of the invention. The process may begin at block 302, where the system 130 receives an event for a predetermined set of occurrences. It shall be appreciated that each of the members (i.e., nodes) of the distributed network may be different entities, different lines of sectors of the same entity, or any combination thereof. Accordingly, as the primary purpose of the invention is to disclose and communicate records associated with users across a plurality of the members, a predetermined definition is agreed-upon for under which circumstances each member will contribute to the distributed ledger in their respective activities.

As used herein, an "occurrence" may refer to various activities involving transactions or personal identification information changes. These activities encompass applying for credit cards, opening new accounts, modifying recorded personal identification details, such as name, address, or social security number, updating contact information, initiating large financial transactions, conducting suspicious monetary transfers, engaging in identity verification processes, or any other related actions that involve the handling and processing of sensitive personal data. These occurrences serve as triggers or indicators that prompt the need for transaction object 204A creation and analysis to ensure security and prevent deceitful activities within the system 130.

As a non-limiting example, it may be predetermined that a new account creation of a consumer at any of the members triggers a mechanism to transmit the details of the new account associated with the consumer to the distributed ledger. Similarly, it may be predetermined that a change in an existing account of a consumer at any of the member triggers a mechanism to transmit the details of the change to the existing account to the distributed ledger.

As a result of the execution of one of at least one of the predetermined set of occurrences, the member corresponding to the occurrence must create a transaction object 204A on the distributed ledger. Accordingly, the entity system of the member first triggers an "event" or process specifically designed to initiate and/or complete gathering of data from the corresponding member of the distributed ledger network associated with the occurrence for integration of the data with the ledger. Thus, the necessary data associated with the occurrence is collected, for example the consumer's unique identifier and relevant details for the opening the new account. As will be described in detail herein, this data is then transformed into structured data, then transmitted to the distributed ledger using a predefined protocol or API, establishing a connection with the ledger network and sending the account details as a transaction or update.

As show in block 304, the system 130 then generates a first hash packet and a second hash packet. The first hash packet is generated by applying a hashing engine to a first identifier. As used herein, a "first identifier" generally refers to the Social Security Number ("SSN") of a consumer. However, it may also refer to any other unique personal identifier code that requires the utmost secrecy and security, such as tax identifiers, credit card numbers, or the like.

As used herein, a "hashing engine" refers to a computational algorithm designed to convert data of any size into a fixed-size string of characters, commonly referred to as a hash. One such hashing engine is SHA-256 (Secure Hash Algorithm 256-bit). However, other hashing algorithms are available as well, including by not limited to MD5 a SHA-1. The hashing engine takes the input data and applies a series of mathematical operations to generate a unique and irreversible hash value. The resulting hash serves as a digital fingerprint of the original data, providing a concise representation that is highly unlikely to collide with hashes from different inputs. Hashing engines are used in various applications, including data integrity verification, password storage, digital signatures, and cryptographic protocols, as they offer efficient and secure ways to handle and verify data integrity.

As described previously, one of the main benefits of this system 130 is that it allows participating members (nodes) to collaborate between one another with reference to individuals, while referencing a hashed version of the first identifier (i.e., an obfuscated first identifier) rather than referencing the true first identifier which could lead to security and identity vulnerabilities. The nature of the hashing is such that only the member node who initiates the hashing is able to determine the underlying first identifier through a supplemental database maintained outside of the distributed ledger network. Thus, each member may retain a respective cross-reference list for the first hash in order to notify the consumer associated with the first identifier of any malfeasance detected.

Similarly, the second hash packet is generated by applying the hashing engine to a second identifier. The "second identifier" as used herein refers to any other soft identifying information, including, but not limited to, name, address, email address, phone number, date of birth, citizenship, purchase history, or the like. In some embodiments, the hashing engine used for the second hash packet may be the same hashing engine as that which was used for the first hash packet. In other embodiments, a different hashing engine may be used for the second hash packet.

The process may continue at block 306, where the system 130 generates, by a distributed ledger server, a first key pair. The first key pair may contain a first public key and a first private key for the member of the distributed ledger network. The generation process begins with the initialization phase, where the distributed ledger server sets up predetermined cryptographic algorithms and parameters. A random number may then be generated by the distributed ledger server, serving as the member's first private key.

Using the first private key, the distributed ledger server may then generate the corresponding first public key through a predetermined algorithm. The corresponding first public key may be distributed by the distributed ledger server to a member of the distributed ledger network. The member of the distributed network may be securely provided with the first private key by the distributed ledger server. The first private key may be transmitted through appropriate cryptographic protocols to prevent interception or tampering.

Accordingly, with the first key pair generated and distributed, the member can now utilize the first public key for various cryptographic operations within the distributed ledger network. These operations may include verifying digital signatures, encrypting or decrypting data, or participating in consensus protocols to validate transactions.

The process may then continue at block 308, the member of the distributed ledger network generates a second key pair comprising a second public key and a second private key. The second key pair is provided to the distributed ledger server for communication from the distributed ledger server to the member of the distributed ledger network. The second key pair is generated in a similar manner as the first key pair. However, the second key pair is generated at each member (node). In other words, each member of the distributed ledger network generates their own respective second key pair to secure any communication from the distributed ledger server to the member. This is in contrast with the first key pair generated in block 306, which is generated by the distributed ledger server and a different public key is shared with each member of the distributed ledger network, such that members can encrypt information before sending it to the distributed ledger server.

As shown in block 310, the process may continue where the system 130 encrypts a bundle using the first public key. A bundle typically consists of two separate hashed datasets, such as the first and second hash packets (that reference the first and second identifiers, respectively) that are combined for a specific purpose or analysis. By combining two separate hashed datasets into a bundle, it becomes possible to perform operations or analyses on the bundled data without directly exposing or revealing the original values.

Next, as shown in block 312, the system 130 may append the bundle, after encryption, to the transaction object 204A, wherein the transaction object 204A is distributed to the distributed ledger network. The transaction object 204A represents the information associated with a particular transaction or event and is intended to be stored and distributed across the distributed ledger network. The bundle may be appended to the transaction object data 208 of the transaction object 204A. After appending the encrypted bundle to the transaction object 204A, the hashed datasets become an integral part of the transaction history stored on the distributed ledger, ensuring their integrity.

In some embodiments, the process may continue as described in FIG. 4. FIG. 4 illustrates a flow diagram 400 for secured data analysis and synthetic identity detection in a distributed ledger network, in accordance with an embodiment of the invention. As shown in block 402, the system 130 extracts, using an extraction engine and the second key pair, the first and second hash packet from the bundle. First, the system 130 may obtain the bundle containing the first and second hash packets. The system 130 may then access an extraction engine, which is software, or a component designed for extracting specific information from bundles. The system 130 then provides the second public key of the second key pair, to the extraction engine. Using the provided key, the extraction engine may then decrypt the bundle, converting it back to its original form (e.g., the first and second hash packet). Once again, this decryption will not expose the underlying first and second identifiers. In some embodiments, the extraction engine may identify and isolate the first and second hash packets from one another. However, in other embodiments, the extraction engine isolates the first and second hash packets and retains them as a unit, such that the first hash packet is associated with the second hash packet and not associated with any other hash packets.

Continuing at block 404, the system 130 aggregates the first and second hash packets in a database known as the pattern tree database, which is shared across all of the members of the distributed ledger network. The pattern tree database may be segmented or otherwise separated to sort various hash packets (both first and second hash packets) from each member of the distributed ledger network that contributes to the pattern tree database. The sorting, splitting, or otherwise delineation within the pattern tree database is such that, by referencing the value of the hash of the first hash packet, the pattern tree database is organized so that each of the activities over time and over any given number of members is combined, adjacent, or otherwise referenced with each other. Accordingly, since each first hash packet has a corresponding second hash packet, patterns of previously unaffiliated second hash packets are related to the same first hash packet value across a predetermined time range and pre-selected members of the distributed ledger network.

Put another way, the database is organized in such a way that the activities over time and across any given number of members are combined, adjacent, or referenced with each other. The key aspect of organizing the pattern tree database is the reference to the value of the hash of the first hash packet. This reference serves as the basis for the organization and allows related data to be grouped together. Each first hash packet is associated with a corresponding second hash packet. Therefore, patterns formed by previously unaffiliated second hash packets can be related to the same first hash packet value across a predetermined time range and a specific set of pre-selected members of the distributed ledger network.

Along with listing various second data packets collected over time related to the same value of the first data packet, in some embodiments, the pattern tree database may further comprise activities and/or violations. For example, in some embodiments, associated with each first hash packet may be the activity that was previously detected as being a violation (i.e., an "anomaly" as will be discussed with respect to block 406 and FIGS. 5 and 6). In other embodiments, associated with each first hash packet may be a text descriptor of the activity that occurred to initiate the recording of the first and second hash packets to the transaction object 204A of the distributed ledger (i.e., the predetermined occurrence that led to the event in block 302).

The process may continue at block 406 where the system 130 determines, using an anomaly detection engine, the presence of an anomaly associated with the first hash packet in the pattern tree database. The anomaly detection engine may take on two embodiments, as will be described with respect to FIGS. 5 and 6. In some embodiments, only one embodiment of the anomaly detection engine may be applied to the data in the pattern tree database. In other embodiments, both anomaly detection engines may be applied to the data in the pattern tree database.

In some embodiments, prior to being subjected to the anomaly detection engine, the data in the pattern tree database may be transformed from unstructured to structured format. Such operations include at least one of data cleaning, normalization, text parsing, feature selection, or extraction to transform the data into a suitable format for analysis.

Turning now to FIG. 5, FIG. 5 illustrates a flow diagram 500 of an anomaly engine for secured data analysis and synthetic identity detection in a distributed ledger network, in accordance with an embodiment of the invention. The anomaly detection engine described in FIG. 5 may be referred to as a "static" anomaly detection engine. The static anomaly engine may be a preliminary analysis of activity within the distributed network of given activity associated with a first hash packet. In such embodiments, further analysis may be required, and as such a positive indication of an anomaly as it related to the static anomaly detection engine subsequently leads to the analysis of the given activity by a dynamic anomaly detection engine, as will be described with respect to FIG. 6. In other embodiments, only the static anomaly detection engine is implemented. In yet additional embodiments, only the dynamic anomaly detection engine is implemented.

The process may begin as illustrated in block 502, where the system 130 analyzes the second hash packets associated with the first hash packet in the pattern tree database. To do so, the system 130 may retrieve the second hash packets associated with the given first hash packet from the pattern tree database, and collect and analyze predetermined categories of information from the second hash packets, such as timestamps, values, metadata, or any other characteristics.

The process may continue at block 504, where the system 130 applies a set of predefined rules indicative of a synthetic identity. A set of rules may be predefined that are indicative of synthetic identity patterns or behaviors. These rules are generally established based on prior knowledge or patterns observed in the data. These predefined rules may then be implemented in the anomaly detection engine's algorithm or rule-based system to evaluate the collected second hash packets and associated information. It shall be understood that activity associated with a given first hash packet within a distributed ledger network may be associated with a pattern in finite automata format. Accordingly, and as is described with respect to the remainder of the functionality of the static anomaly detection engine, finite automata can be used to identify anomaly patterns by modeling normal behavior and detecting deviations from that behavior.

As shown in block 506, the system 130 may then determine the presence of an anomaly in the pattern tree database by comparing a pattern of the first hash packet in the pattern tree database to the predefined rules. The system 130 compares the pattern of the first hash packet, such as its values, timestamps, or related attributes, to the predefined rules for synthetic identity detection. Next, the system 130 may assess the degree of similarity or deviation between the pattern of the first hash packet and the predefined rules. If the pattern deviates from the predefined rules such that the deviation percentage is above a predetermined threshold, the system 130 may classify it as an anomaly or potential synthetic identity.

The process may continue at block 508, where when an anomaly is detected based on the predefined rules, the anomaly detection engine of the system 130 generates an alert. An alert may contain details regarding the anomaly, including the specific first hash packet, associated second hash packets, timestamps, and any other relevant details. The alert may be transmitted to endpoint device(s) 140 of relevant stakeholders through various means such as emails, notifications, APIs, or integration with a monitoring platform.

In some embodiments, the alert transmitted to the endpoint device(s) 140 may contain a user input. For example, since the alert contains details of the anomaly, the alert may contain one or more buttons such as "anomaly" or "not an anomaly" configured to receive input from a user such that the user can overrule or confirm the findings of the anomaly detection engine. In continuing with the example, in receiving an input of "not an anomaly", the anomaly detection engine may remove any tags, marking, or otherwise, used to identify the identified first hash packet.

FIG. 6 illustrates a flow diagram 600 of an anomaly engine for secured data analysis and synthetic identity detection in a distributed ledger network, in accordance with an embodiment of the invention. The anomaly detection engine described in FIG. 6 may be referred to as a "dynamic" anomaly detection engine. The dynamic anomaly engine utilizes a machine learning engine to identify patterns of activity associated with a given first hash packet that may indicate an attempt of a malfeasant actor to create a synthetic identity using the first hash packet.

The process may begin at block 602, where a machine learning engine is trained on historical pattern tree databases to adaptively determine the presence of an anomaly. Training of the machine learning engine may occur by first preprocessing and transforming historical pattern tree database data. Preprocessing may include cleaning, normalizing, and/or removal of missing values or outliers. The historical pattern tree database data may then be transformed into a suitable format for machine learning algorithms or enhanced to improve the quality of the data such as through dimensionality reduction techniques or scaling. Next, the relevant features may be extracted by applying a set of predefined rules. The application of predefined rules may follow the same steps as the application of predefined rules as described with respect to block 504.

The machine learning engine may then be trained on the relevant features. To do so, based on the nature of the anomaly detection task and the available historical pattern tree database data, a user selects an appropriate machine learning algorithm, for example supervised learning, unsupervised learning, or semi-supervised learning. The historical pattern tree database data may then be split into training and validation sets, where the training set is predetermined by a user and selected to provide to the machine learning engine the relevant features extracted from the historical pattern tree database data of what is known to be activity associated with synthetic identity misappropriation, historical pattern tree database data of what is known to be activity not associated with synthetic identity misappropriation, and corresponding anomaly labels. The machine learning engine may then be fine-tuned, validated, and otherwise adjusted to improve the performance.

Continuing at block 604, the system 130 may the analyze, in real time, by the machine learning engine, the pattern tree database for presence of the anomaly. In other words, the incoming data from the pattern tree database may be continuously collected, pre-processed, transformed, and subjected to the machine learning engine, where the machine learning engine analyzes the features and determines the probability of an anomaly being present. Based on the probability being above or below a predefined threshold, the machine learning engine then classifies the real-time data as either normal or anomalous.

As shown in block 606, in some embodiments the anomaly detection engine generates alerts or takes a predetermined action when an anomaly is detected. An alert may contain details regarding the anomaly, including the specific first hash packet, associated second hash packets, timestamps, and any other relevant details. The alert may be transmitted to endpoint device(s) 140 of relevant stakeholders through various means such as emails, notifications, APIs, or integration with a monitoring platform. In some embodiments, the alert transmitted to the endpoint device(s) 140 may contain a user input. For example, since the alert contains details of the anomaly, the alert may contain one or more buttons such as "anomaly" or "not an anomaly" configured to receive input from a user such that the user can overrule or confirm the findings of the anomaly detection engine. In continuing with the example, in receiving an input of "not an anomaly", the anomaly detection engine may remove any tags, marking, or otherwise, used to identify the identified first hash packet.

Returning back to FIG. 4, as shown in block 408 the system 130 may then transmit, from the distributed ledger server to at least one distributed ledger member using the second key pair, an indication of the anomaly. As a result of the disposition of the alert as described with respect to block 508 and/or block 606, the system 130 may receive a positive indication that an anomaly is present. For example, if the anomaly detection engine transmits an alert to an endpoint device(s) 140, and a user at the endpoint device(s) 140 inputs a positive confirmation that there is indeed an anomaly, the system 130 may transmit this information to one or more of the members of the distributed ledger network.

In some embodiments, the member who originated the hashing of the first identifier may be the only member of the distributed ledger network to receive the transmission of the indication of the anomaly, such as to determine based on an external database the identity associated with the first hash packet. In other embodiments, a plurality of members of the distributed ledger network receive the transmission of the indication of the anomaly, such that each of the members of the distributed ledger network can freeze, remove, or otherwise evaluate and/or modify any accounts associated with the first hash packet.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for secured data analysis and synthetic identity detection in a distributed ledger network, the system comprising:
   a processing device; and
   a non-transitory storage device having a distributed ledger application stored therein, wherein the distributed ledger application comprises a distributed ledger comprising a plurality of transaction objects, wherein the distributed ledger application comprises instructions that, when executed by the processing device, causes the processing device to perform the steps of:
   receiving an event from a member of the distributed ledger network for at least one of a predetermined set of occurrences requiring creation of a transaction object;
   generating a first hash packet and a second hash packet, wherein the first hash packet is generated by applying a hashing engine to a first identifier, and wherein the second hash packet is generated by applying the hashing engine to a second identifier;
   generating, by a distributed ledger server, a first key pair comprising a first public key and a first private key for the member of the distributed ledger network;
   generating, by the member of the distributed ledger network, a second key pair comprising a second public key and a second private key, wherein the second key pair is provided to the distributed ledger server for communication from the distributed ledger server to the member of the distributed ledger network);
   encrypting a bundle using the first public key, wherein the bundle comprises the first and second hash packets;
   appending the bundle, after encryption, to the transaction object, wherein the transaction object is distributed to the distributed ledger network;
   extracting, using an extraction engine and the second key pair, the first and second hash packet from the bundle;
   aggregating, based on the first hash packet, and into a pattern tree database, the first hash packet and the second hash packet;
   determining, using an anomaly detection engine, a presence of an anomaly associated with the first hash packet in the pattern tree database; and
   transmitting, from the distributed ledger server to at least one distributed ledger member using the second key pair, an indication of the anomal.

2. The system of claim 1, wherein the anomaly is detected via a static analysis process, wherein the static analysis process comprises:
   analyzing the second hash packets associated with the first hash packet in the pattern tree database;
   applying a set of predefined rules indicative of a synthetic identity;
   determining the presence of an anomaly in the pattern tree database by comparing a pattern of the first hash packet in the pattern tree database to the predefined rules; and
   generating and transmitting an alert of the anomaly.

3. The system of claim 1, wherein the anomaly is detected via a dynamic pattern analysis process, wherein the dynamic pattern analysis process comprises:
   training a machine learning engine on historical pattern tree databases to adaptively determine the presence of an anomaly, wherein training comprises:
   preprocessing and transforming historical pattern tree database data;
   extracting relevant features by applying a set of predefined rules; and
   training the machine learning engine on the relevant features;
   analyzing, in real time by the machine learning engine, the pattern tree database for presence of the anomaly; and
   generating and transmitting an alert of the anomaly.

4. The system of claim 1, wherein the pattern tree database further comprises activities and/or violations.

5. The system of claim 1, wherein each member retains their respective cross-reference list for the first hash packet.

6. The system of claim 1, wherein the member of the distributed ledger network is provided a unique first public key.

7. A computer program product for secured data analysis and synthetic identity detection in a distributed ledger network, the computer program product comprising a non-transitory computer-readable medium comprising code causing an apparatus to:
   receive an event from a member of the distributed ledger network for at least one of a predetermined set of occurrences requiring creation of a transaction object;
   generate a first hash packet and a second hash packet, wherein the first hash packet is generated by applying a hashing engine to a first identifier, and wherein the second hash packet is generated by applying the hashing engine to a second identifier;
   generate, by a distributed ledger server, a first key pair comprising a first public key and a first private key for the member of the distributed ledger network;
   generate, by the member of the distributed ledger network, a second key pair comprising a second public key and a second private key, wherein the second key pair is provided to the distributed ledger server for communication from the distributed ledger server to the member of the distributed ledger network;
   encrypt a bundle using the first public key, wherein the bundle comprises the first and second hash packets;
   append the bundle, after encryption, to the transaction object, wherein the transaction object is distributed to the distributed ledger network;
   extract, using an extraction engine and the second key pair, the first and second hash packet from the bundle;
   aggregate, based on the first hash packet, and into a pattern tree database, the first hash packet and the second hash packet;
   determine, using an anomaly detection engine, a presence of an anomaly associated with the first hash packet in the pattern tree database; and
   transmit, from the distributed ledger server to at least one distributed ledger member using the second key pair, an indication of the anomaly.

8. The computer program product of claim 7, wherein the code further causes the apparatus to:
- analyze the second hash packets associated with the first hash packet in the pattern tree database;
- apply a set of predefined rules indicative of a synthetic identity;
- determine the presence of an anomaly in the pattern tree database by comparing a pattern of the first hash packet in the pattern tree database to the predefined rules; and
- generate and transmitting an alert of the anomaly.

9. The computer program product of claim 7, wherein the code further causes the apparatus to:
- train a machine learning engine on historical pattern tree databases to adaptively determine the presence of an anomaly, wherein training comprises:
  - preprocessing and transforming historical pattern tree database data;
  - extracting relevant features by applying a set of predefined rules; and
  - training the machine learning engine on the relevant features;
- analyze, in real time by the machine learning engine, the pattern tree database for presence of the anomaly; and
- generate and transmit an alert of the anomaly.

10. The computer program product of claim 7, wherein the pattern tree database further comprises activities and/or violations.

11. The computer program product of claim 7, wherein each member retains their respective cross-reference list for the first hash packet.

12. The computer program product of claim 7, wherein the member of the distributed ledger network is provided a unique first public key.

13. A method for secured data analysis and synthetic identity detection in a distributed ledger network, the method comprising:
- receiving an event from a member of the distributed ledger network for at least one of a predetermined set of occurrences requiring creation of a transaction object;
- generating a first hash packet and a second hash packet, wherein the first hash packet is generated by applying a hashing engine to a first identifier, and wherein the second hash packet is generated by applying the hashing engine to a second identifier;
- generating, by a distributed ledger server, a first key pair comprising a first public key and a first private key for the member of the distributed ledger network;
- generating, by the member of the distributed ledger network, a second key pair comprising a second public key and a second private key, wherein the second key pair is provided to the distributed ledger server for communication from the distributed ledger server to the member of the distributed ledger network;
- encrypting a bundle using the first public key, wherein the bundle comprises the first and second hash packets;
- appending the bundle, after encryption, to the transaction object, wherein the transaction object is distributed to the distributed ledger network;
- extracting, using an extraction engine and the second key pair, the first and second hash packet from the bundle;
- aggregating, based on the first hash packet, and into a pattern tree database, the first hash packet and the second hash packet;
- determining, using an anomaly detection engine, a presence of an anomaly associated with the first hash packet in the pattern tree database; and
- transmitting, from the distributed ledger server to at least one distributed ledger member using the second key pair, an indication of the anomaly.

14. The method of claim 13, wherein the anomaly is detected via a static analysis process, wherein the static analysis process comprises: analyzing the second hash packets associated with the first hash packet in the pattern tree database;
- applying a set of predefined rules indicative of a synthetic identity; determining the presence of an anomaly in the pattern tree database by comparing a pattern of the first hash packet in the pattern tree database to the predefined rules; and generating and transmitting an alert of the anomaly.

15. The method of claim 13, wherein the anomaly is detected via a dynamic pattern analysis process, wherein the dynamic pattern analysis process comprises:
- training a machine learning engine on historical pattern tree databases to adaptively determine the presence of an anomaly, wherein training comprises:
  - preprocessing and transforming historical pattern tree database data;
  - extracting relevant features by applying a set of predefined rules; and
  - training the machine learning engine on the relevant features;
- analyzing, in real time by the machine learning engine, the pattern tree database for presence of the anomaly; and
- generating and transmitting an alert of the anomaly.

16. The method of claim 13, wherein the pattern tree database further comprises activities and/or violations..

17. The method of claim 13, wherein each member retains their respective cross-reference list for the first hash packet.

* * * * *